Oct. 14, 1969  H. TROEGER  3,472,091
POWER AMPLIFIER VARIABLE SPEED SERVO-MECHANISM CONTROL
Original Filed June 14, 1966  4 Sheets-Sheet 1

HENRY TROEGER
INVENTOR

BY

HENRY TROEGER
INVENTOR.

Oct. 14, 1969 H. TROEGER 3,472,091
POWER AMPLIFIER VARIABLE SPEED SERVO-MECHANISM CONTROL
Original Filed June 14, 1966 4 Sheets-Sheet 4

HENRY TROEGER
INVENTOR.

BY
W S Thompson

United States Patent Office

3,472,091
Patented Oct. 14, 1969

---

3,472,091
POWER AMPLIFIER VARIABLE SPEED SERVO-MECHANISM CONTROL
Henry Troeger, Cooperstown, N.Y., assignor to The Bendix Corporation, a corporation of Delaware
Original application June 14, 1966, Ser. No. 557,434, now Patent No. 3,407,677, dated Oct. 29, 1968. Divided and this application Sept. 18, 1968, Ser. No. 760,398
Int. Cl. F16h 35/00
U.S. Cl. 74—388                                         9 Claims

ABSTRACT OF THE DISCLOSURE

A variable speed mechanical servo mechanism control in which a plurality of spheres in a retaining cage interconnect a pair of conical surfaces to transmit rotary energy therebetween. The spheres are arranged to selectively be moved axially between the conical surfaces. A second set of spheres are retained to roll between a fixed plate and a rotary plate to establish a ½ speed reference in their retaining cage. A third set of spheres are retained within a cam-surfaced cage between a plate associated with one of the conical surface members and a plate connected to the reference retaining cage such that variation in the relative location in the first set of spheres varies the speed of the outer conical surface member with respect to the established reference to rotate the cam-surfaced member and generate a correcting signal.

---

This invention is a division of my co-pending application Ser. No. 557,434, filed June 14, 1966, now Patent No. 3,407,677, and entitled "Power Amplifier."

The present invention relates to a mechanical power amplifier position control unit and, more particularly, to a power amplifier position control unit for controlling the movement of aircraft control surfaces or parameters such as ailerons, rudders, elevators, turbine engine exhaust nozzles, and the like.

In mechanical power amplifiers, it is desirable to have an output which is substantially proportional to the difference between input signal and output signal. The output signal may be a velocity signal or an average velocity over a predetermined time period, or it may be a torque signal. At times, the difference between the two signals may be sufficiently small so that the amplifier has no output. Such a condition is termed the "idle state." During the idle state, it is highly desirable to provide a mechanical power amplifier which has substantially no sliding friction so as to prolong component life and reduce amplifier heat output and improve control accuracy. Accordingly, it is an object of the present invention to provide a power amplifier position control unit which can idle without sliding friction.

It is an object of the present invention to provide a novel power amplifier position control unit which employs a reversible planetary gear reduction system in a ball drive system which is light in weight, self-contained, and has short transient response times.

In a mechanical power amplifier position control unit employing a reversible planetary gear reduction system, forward and reverse control is achieved by braking various segments of the planetary gear system. Accordingly, in a power amplifier position control unit, it is desirable and it is an object of the present invention to provide a variable speed transmission to provide brake actuation energy for braking sections of the reversible planetary gear reduction system.

It is an object of the present invention to provide a rate of application of braking forces which are proportional to the difference between input signal and output position.

It is an object of the present invention to provide a ball drive for a power amplifier position control unit in which there is substantially no sliding or dynamic friction.

It is a further object of the present invention to provide a ball drive control unit for a mechanical power amplifier having a feedback cam to provide brake actuation energy proportional to the difference between input position and output position.

It is a further object of the present invention to provide a ball drive control unit for a mechanical power amplifier having a feedback cam in which the cam has a region of functionally substantially zero output so that actuation of braking or holding forces to sections of the power amplifier variable speed transmission is not effective until a predetermined minimum level of holding power is obtained.

It is a further object of the present invention to provide a mechanical friction type variable speed ratio power amplifying device having output velocity proportional to small input errors and output position proportional to large input errors.

It is a further object of the present invention to provide a novel linkage to sense both input position and output position and supply that information to a variable speed drive ratio device to control the output position.

In the drawing wherein a power amplifier position control system embodying the invention is illustrated:

Figure 1:
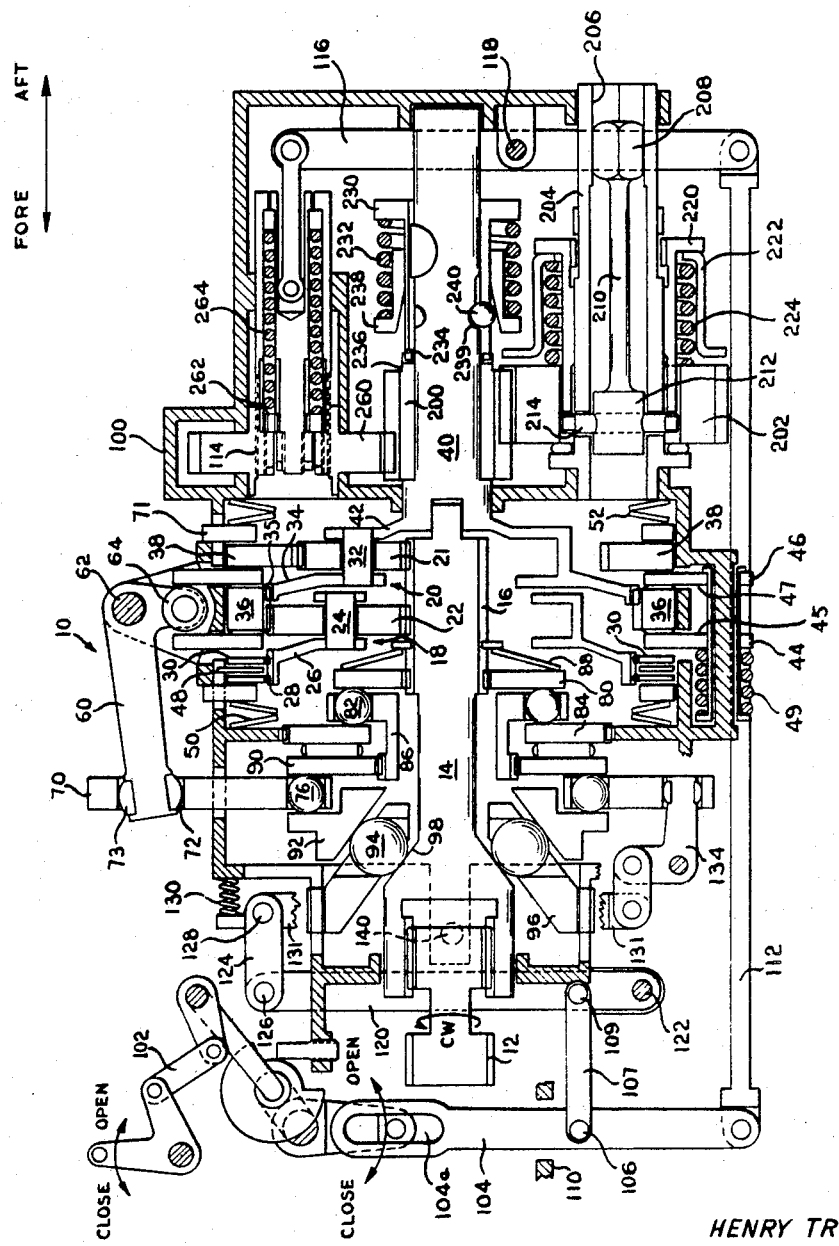
FIGURE 1 is a schematic of the power amplifying position and control unit shown in a longitudinal view.
Figure 2:
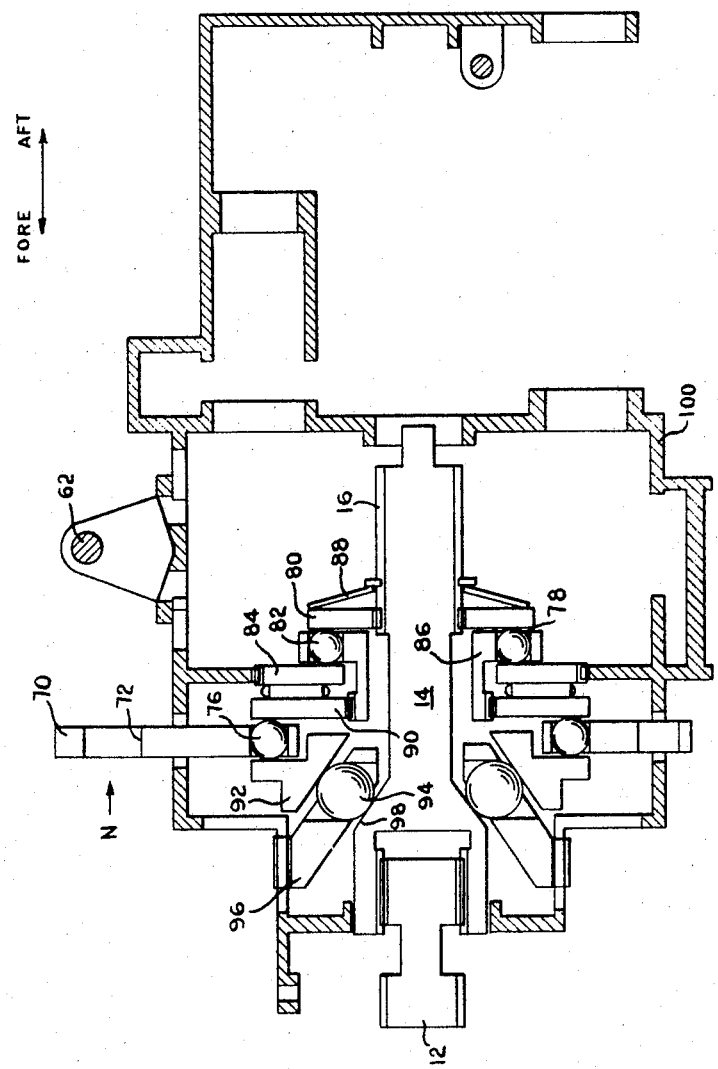
FIGURE 2 is a fragmentary longitudinal view of the control unit system direction control mechanism.

The output control mechanism in the present embodiment of this invention comprises a ball drive mechanism of the following parts (shown in FIGURE 1 and in detail in FIGURE 2). Although spherical and conical geometrical elements are shown in the present embodiment, those skilled in the are will recognize that other shaped elements could be employed. An input drive plate 80 is slidably splined to sun gear 16 and is biased by a spring 88 into contact with a plurality of input ball members 82 which are, in turn, contacted by stationary reaction plate member 84 which is splined to the housing 100. A ball-retaining cage member 86 is thus driven by the ball members 82 at a speed equal to one-half of that of the input shaft 14 and in the same direction as the drive shaft 14. The cage 86 has a splined connection to a speed reference drive plate 90 which grips cam disc rotary ball members 76 between it and a variable speed reference drive plate 92. A variable speed ball cage 96 splined to the housing 100 for axial movement with respect to the housing has a plurality of ball members 94 which ride on an inclined conical surface 98 of the input shaft 14 between that conical surface 98 and an inclined surface of the variable speed reference drive plate member 92. As the position of the ball members 94 varies on the conical surface 98, the speed of rotation of the variable speed reference drive plate member 92 will be affected.

If ball members 94 move without slipping on inclined surface 98, then each ball member 94 must have the same instantaneous linear velocity as the inclined conical surface 98 at the point of contact between the ball members 94 and the inclined surface 98. The instantaneous linear velocity of a point on a curved surface which can be considered to rotate about a point, is proportional to the product of the number of revolutions per unit time and the length of the radius vector at the point. Although any point on the inclined surface 98 has, for any given time increment, the same number of revolutions, the length of the radius vector is variable, causing the instantaneous velocity of the ball members 94 to change. Changing the point of contact between the inclined surface 98 and the balls 94 causes the point of contact between the balls 94 and the inclined surface of the variable speed reference drive plate member 92 to change, thereby also changing the radius vector through which the speed reference drive plate member 92 is driven by the balls 94. However, this change in radius vector through which the reference drive plate member 92 is driven is less, as a percentage of the total radius vector length, than that change in the radius vector of the inclined surface 98 which is driving the balls 94.

Assuming that the balls 94 are in a position on the conical surface 98 such that ball bearing elements 94 contact the second cam disc drive plate 92 at a radius exactly twice that of their contact with the conical surface 98, the second cam disc drive plate 92 will be driven in a counterclockwise direction at a speed equal to one-half the speed of input shaft 14. When the balls 94 are in the assumed position, this is a neutral drive position for the cam disc member 70 and results in no output of the main shaft 40 since balls 76 spin on their own axis and do not rotate about shaft 14. The zero output results in the fact that the second cam disc drive plate 92 is rotating in a counterclockwise direction at a speed equal to one-half the input speed, while at the same time the first cam disc drive plate 90 is rotating in a clockwise direction at an equal speed. This causes the balls 76 to turn within the cam disc member 70 without causing its rotation.

Should, however, the variable speed ball cage 96 be moved "fore" or "aft" on the conical surface 98, the second cam disc drive member 92 would no longer be operating at half the speed of the input shaft 14 (as previously explained) and the balls 76 would power or drive the cam disc member 70 in the direction of the faster of the rotating pressure plate members 90 or 92 at a speed equal to the difference between that of the rotation of the first and second cam disc drive plate members. Rotation of the cam disc drive member 70 causes the rollers 73, as shown in FIGURE 1, to follow the contour of the cam surface 72 and to change radius with respect to the main shaft 14, thereby moving the rollers 64 either "fore" or "aft" as referenced in the drawing. Whenever the cam disc drive member 70 is displaced from the neutral position causing the rollers 64 to be displaced either "fore" or "aft" as shown in FIGURE 1, the output shaft 40 will be driven either counterclockwise or clockwise respectively. Rotation of the output shaft 40, over a period of time, yields a position change in the output since the rotational velocity of the output shaft, multiplied by the time of rotation, gives a displacement or output position change.

CONTROL LINKING SYSTEM

Figure 3:
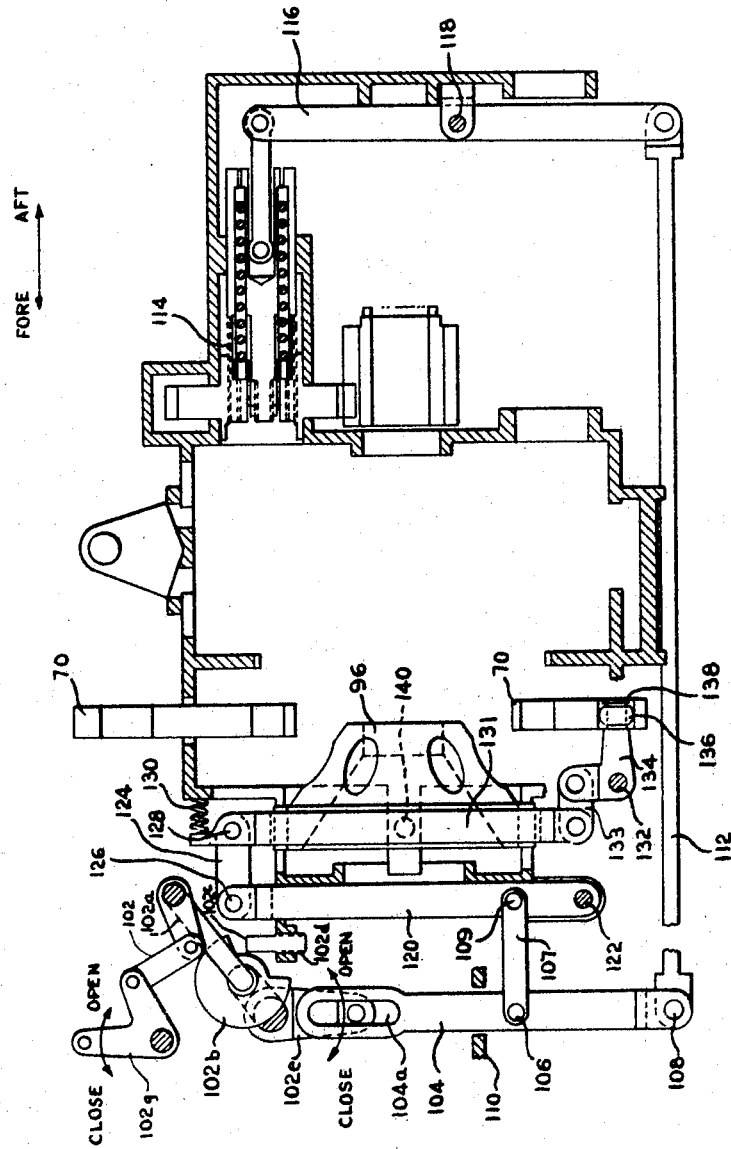
FIGURE 3 is a fragmentary longitudinal view showing the power unit control linkage system.

Turning now to FIGURE 3 there is shown control linkage elements for controlling the position of the variable speed ball cage member 96 which controls the direction and speed of rotation of the cam disc member 70 which, in turn, controls the direction and speed of rotation of the main shaft 40.

Input position signals are fed into the power amplifier position and control unit through the multiple linkages shown generally by the numeral 102. Rotation of the input lever 102g, in the direction indicated by "close," causes the rotation of the shaft 102a which causes the rotation of the linkage member 102e which is fixedly connected to the shaft 102a to position the summing bar 104. For clarity, the shaft 102a is shown in perspective in FIGURES 1 and 3 while all other portions of the linkage 102 are shown in plane view. All portions of the linkage 102 shown connected to shaft 102a are fixedly connected thereto. The summing bar 104 has a slot or lost motion connection 104a with the linkage 102e such that the rotary motion of the linkage 102e may cause reciprocal or translatory movement of the summing bar 104. The other end of summing lever 104 receives an output position signal from the feedback arm 112 which is pivotally connected to the summing lever 104 by pivot 108. Output position is sensed by threaded member 114 which is positioned by the output of the planetary gear drive system. A second feedback lever 116 is pivotally connected to the housing pivot 118 and interconnects the threaded member 114 and the feedback linkage 112. Input-output link 107 feeds the algebraic sum of the input position and output position supplied by the input arm 102e and the feedback arm 112, respectively, to the multiplying lever 120. The input-output member 107 is pivotally connected to the summing lever 104 at pivot 106 and to the multiplying lever by pivot 109. The multiplying lever 120 has a pivotal connection 122 to the housing and a connection through linkage 124 to a second summing lever 131. Connecting linkage 124 is pivotally connected to the error multiplying lever 120 by a pivot 126 and pivotally connected to the second summing lever 131 by pivot connection 128. A resilient or spring member 130 biases the second summing lever 131 to remove linkage backlash, and to bias the input lever 102g to a desired position. The second summing lever 131 is interconnected to the variable speed ball cage member 96 by a pivotal connection 140 which is able to cause the translation of the variable speed ball cage member 96. A feedback bell crank arm 134 rides in the cam disc feedback slot 136. The feedback bell crank arm 134 is pivotally-connected to the housing by pivot 132 and has a linkage 133 which is pivotally-connected between the bell crank arm 134 and the summing lever 131. Thus, the summing lever 131 is sensing the multiplied difference between input position command and actual output position of the cam disc member 70.

Saturation of the amplifier is prevented by the stops which are shown schematically by member 110 which abuts the first summing member input lever 104. The disc segment 102b serves as a maximum-minimum input and it cooperates with the saturation or overload stops 102c and 102d to prevent over-loading of the amplifier. The shaft 102a is rotated either by movement of the input lever 102g or by movement of the summing bar 104. As the shaft rotates about its longitudinal axis, the disc segment 102b will abut either of the stop 102c or 102d after a limited amount of rotation.

Figure 4:
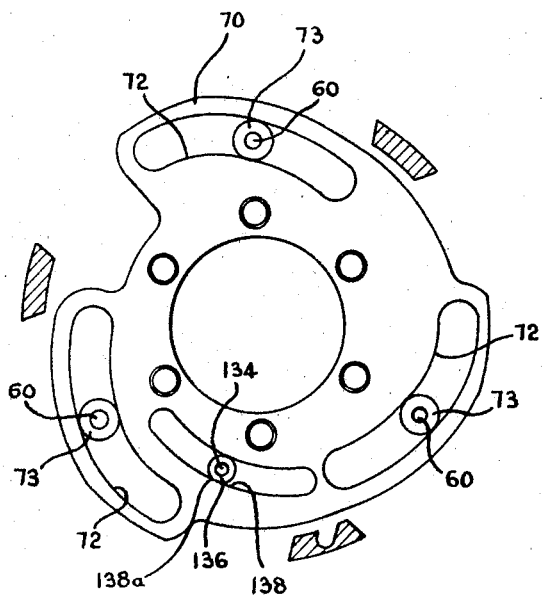
FIGURE 4 is a view of a cam disc used in a direct and feedback control of the braking elements shown in FIGURE 2.

The cam disc member 70, shown in plane view in FIGURE 4, is an important functional element of the control unit. The cam disc 70 consists of a plurality of cam slots 72 which are contoured to cause the movement of the bell crank arms 60 which position the holding and output brakes. Rollers 73 are connected to the bell crank arm 60 and ride in the contoured slot 72. A feedback slot 138 is contoured to actuate feedback bell crank arm 134 which rides on roller 136 in the contoured slot 138. The slot 138 is formed in an Archimedean spiral, and has a deadband region 138a in which no movement of the feedback arm 134 occurs. This deadband portion 138a may be of a variable extent so that the timing of the feedback positioning of the cam disc 70 may be controlled so that sufficient braking torque is available to brake members, thereby preventing continuous sliding friction from occurring during the operation of the power amplifier position control unit.

Briefly turning now to FIGURE 1, an output feedback gear 260 is driven by the main drive gear 200. The output feedback gear 260 is journalled in the housing 100 and has a threaded inner diameter which is engaged by a threaded member 114 which is operatively connected and spring biased by spring 264 to output position feedback member 262. The spring 264 serves as a double acting oversaturation spring so that when disc segment 102b abuts either stop 102c or 102d, or summing bar 104 abuts stop 110 and linear movement of the feedback linkage is terminated, the threaded member 114 is still capable of linear motion. This is necessary since output feedback gear 260 and member 114 are threaded together and gear 260 may still be turning after the linear motion of the feedback linkage has been terminated.

Assuming that the drive is in neutral and that the output shaft 40 is not rotating, the ball drive cage 96 is thus in a neutral position and the ball bearings themselves are driving the second cam disc drive plate counterclockwise at one-half the input power shaft speed. If now the operator decides to open, for example, let us say, the exhaust nozzle, the input linkage 102 is moved in the open direction which causes a lever 104 to pivot in the "aft" or "open" direction as referenced in the drawing which, in turn, through the multiplying lever 120, the connecting arm 124 and the second summing lever 131, causes the variable speed ball cage member 96 to be moved aft. This action reduces the speed of the second cam disc plate drive member 92 and causes the cam disc 70 to rotate in a clockwise direction, thereby actuating the control arm 60 and in the embodiment shown, because of the contour of the cam slot 72, causing the arm to be pulled radially inwardly, thereby positioning the roller 64 in an "aft" direction, causing the main shaft 40 to be driven in a clockwise direction. As the output position sensing member 114 detects the corrected output position, it repositions the input-output lever 104 through the feedback linkages 116 and 112 and will again cause the variable speed ball drive cage 96 to return to a neutral position. Cam disc 70 position is continuously sensed by rollers 136 rolling in cam slot 138 which is fed to second summing lever 131 connected to the variable speed drive member 96 by feedback arm 134. Thus, the control linkage system relays to the variable speed ball drive mechanism 96, both input and output position and cam disc position. Feedback linking arm 134 will cause the cam disc 70 to return to a neutral position, as input signal and output position signal indicate that the desired output position is attained. Feedback arm 134 positions the second summing lever 131 as a function of cam disc 70 position. Positioning the second summing lever 131 positions the variable speed ball cage 96 through the pivot connection 140a. Positional feedback of the summing lever 131 by the feedback arm 134 is affected only after sufficient cam disc 70 rotation is achieved to assure that the braking forces holding the first planetary gear cage 24 or the second ring gear 38 are sufficient to carry the full torque transmitted to those members. The delay in positional feedback is achieved through the deadband region 138a formed in the cam disc contoured feedback slot 138. As the desired output position is achieved, the cam positional feedback arm 134 will position the variable speed ball cage 96 such that the came disc 70 will reverse rotation and return to a neutral position.

OPERATION

Referring now to FIGURE 1, a schematic of the power amplifier position control unit is shown. In operation, the unit acts as follows: Assuming that the power amplifier is in a neutral position and that the output is in a position which is stable with respect to the input wherein the input linkage 102 is moved in the "close" direction as indicated in the drawing, it will position the input-output summing lever 104 in the "close" direction as indicated in the drawing. This movement of the summing lever 104 will be transmitted by the linking member 107 to the multiplying lever 120 which, in turn, will multiply the force and then transmit it to the second summing lever 131 which, through the pivot connection 140, will move the variable speed ball cage member 96 in the forward direction and cause the cam disc drive plate 92 to be driven faster in the counterclockwise direction. This, in turn, will cause the balls 76 to translate, causing the motion of the cam disc 70 and, in turn, the bell crank arm 60 which positions the brake members. Counterclockwise motion of the cam disc 70 will cause the bell crank arm to be moved in the "upward" direction, as referenced in the drawing, and will cause the actuation of the pressure plate 44 to be moved in the forward direction, causing the engagement of the brake discs 30 with the brake member 48 to prevent the rotation of the planet carrier 24 and releasing the first ring gear at holding brake member 36. In this condition, the input shaft 12 transmits power through the sun gear 16 to the planet gear member 22 which causes the rotation of the first ring gear 36 which, in turn, is engaged by the first planet carrier 34 with gears 35 formed thereon and causes the rotation of the planet carrier 32 which is mechanically linked through the arm 42 to the main output shaft 40. The rotation of the main shaft 40 is in the counterclockwise direction. Conversely, if the power amplifier position control unit has been in the neutral position to begin with and the linkage 102 has been moved in the "open" direction, this would cause the levers 104 and 120 to be moved in the "open" direction, causing the movement of the variable ball speed cage member 96 to be "aft" and decreasing the speed of the first cam disc drive 92. Decreasing the speed of the drive 92 would cause the balls 76 to rotate about the main shaft 14 in a clockwise direction and would pull the bell crank arm inward relative to the housing. This motion of the bell crank arm would move the pressure plate 46 "aft" as shown in the drawing and would prevent the rotation of the second ring gear member 38. In this mode of operation, the input gear 12 is rotating the sun gear 16 which causes the rotation of the planet gear 21 and the planet carrier 32 is rotated in a clockwise direction. The rotation of the planet carrier 32 is linked through the arm 42 to the main output shaft 40 which is rotated in a clockwise direction also. The first planet gear 22 has a first ring gear 36 which is free to rotate and transmit no torque. If, as in the embodiment shown, the number of teeth in the second ring gear member 38 equals the sum of the number of teeth on the sun gear 16 and the number of teeth on the first ring gear 36, then the gear reduction ratio in both directions is equal.

It can be seen that the device is clearly able to accomplish its stated objects. It is a fully-automatic, self-contained, power amplifying and position control unit in which even small differences between input and output are capable by virtue of providing sufficient energy to operate the brakes as necessary to provide adequate torque to reposition the output and reduce the error to an acceptable value. The device can be made as sensitive to variations between the output position and input selector position as is desired. It can be seen that from the small inertia of the control system that response time is quite short and that positioning can be exceedingly precise. The device is self-protecting in that its overload release mechanism will prevent damage to the unit. Further, the overload release can be readily and easily manually-reset by any one of a number of known methods. The reference directions shown and described have been shown merely for the purposes of description and are not to be deemed limiting in any sense. The device is, of course, capable of operating at a wide range of physical environments. It may be air-cooled and does not need separate cooling. Furthermore, the device is non-inertial and will operate in a zero gravity environment.

It can be readily appreciated that by positioning the input lever that, in turn, the variable speed ball cage 92 is positioned to control the cam disc member 70 which, in turn, controls the braking mechanisms to determine which direction, if any, the output shaft 40 will be driven. The feedback from output position is furnished by the output position threaded member 114 and is, in turn, fed around to the input position levers. Further, of course, the control mechanism, the cam disc, has a feedback arm which is connected to the variable speed ball cage member.

I claim:
1. A control signal apparatus comprising:
   a rotary member operative to establish a first rotary speed;
   first means establishing a reference rotary speed at a first fixed ratio with regard to the first rotary speed;
   second means establishing a second rotary speed having a selectably variable ratio with regard to the first rotary speed;
   control means operative with said second means to selectably vary said ratio; and
   third means for comparing the difference between said fixed ratio and said variable ratio to generate a control signal.

2. A control signal apparatus as claimed in claim 1 including: feedback means responsive to the difference between said fixed ratio and said variable ratio to modify said variable ratio.

3. A control signal apparatus comprising:
   a rotatably-driven shaft having a conical portion formed thereon;
   a variable speed ratio ball cage member having a plurality of ball retaining pockets concentrically-arranged relative to said driven shaft a spaced distance radially outwardly from said conical portion;
   an annular variable speed ratio drive plate member having an inner conical surface substantially parallel with said conical portion of said driven shaft concentric and spaced radially outwardly of said variable speed ball cage member;
   a plurality of variable speed ratio ball members disposed in said ball retaining pockets and abutting said conical portion and said conical surface;
   control means connected to said ball cage member operative to axially-position said ball cage member to vary the axial location of said ball members with respect to said conical portion and to thereby vary the rotational speed ratio between said shaft and said annular variable speed ratio drive plate member; and
   output means for responding to the variation in said ratio.

4. The apparatus as claimed in claim 3 wherein said control means comprise:
   input linkage means for establishing a desired output;
   feedback linkage means for establishing a comparative level of attained output; and
   summing linkage means for combining the signals from said input linkage means and said feedback linkage means.

5. The apparatus as claimed in claim 3 wherein said output means comprise:
   speed reference plate means coupled to said shaft for providing said variable speed ratio drive plate member with a speed reference;
   signal means interconnecting said reference plate means and said variable speed ratio drive plate member and responsive to the rotational speeds thereof to generate a signal indicative of a rotational speed ratio therebetween;
   means for using said speed ratio signal; and
   transmission linkage means interconnecting said signal means and said means for using said signal.

6. The apparatus as claimed in claim 5 wherein said signal means comprise:
   a cam disc means;
   a plurality of rotary members retained in said cam disc means and in rolling contactive engagement with said reference plate means and said variable speed ratio drive plate member;
   said reference plate means and said variable speed ratio drive plate member operative to rotate in opposed directions; and
   said rotary members operative to rotate under the influence of said rolling contactive engagement and to drive said cam disc means at a speed equal to one-half the net difference in rotational speeds in the direction of the faster of the two.

7. The apparatus as claimed in claim 6 wherein said reference plate means comprise:
   a first plate connected to said rotatably-driven shaft for rotation therewith;
   a second plate disconnected from said shaft to maintain a stationary relationship therewith;
   a reference speed ball cage intermediate said first and second plates and having a portion extending axially-parallel to said shaft and a portion radially-extending therefrom substantially-parallel said first and second plates and axially-spaced therefrom;
   said radially-extending portion in contactive engagement with said rotary members so as to estabilsh a speed and direction of rotation reference for said rotary members; and
   a set of reference speed balls retained in said cage.

8. The apparatus as claimed in claim 3 wherein said control means comprise:
   input signal linkage means for establishing a level of desired input;
   output sensing linkage means for determining a level of achieved output;
   first summing link means connected to said input signal linkage means and said output sensing linkage means to establish an algebraic sum of said desired input and achieved output;
   second summing link means connected to said variable speed ball cage member;
   feeding and multiplying linkage means interconnecting said first and second summing link means operative to vary the axial location of said variable speed ball cage member in order to vary the ratio of rotational speed transferred therethrough;
   speed sensing means operative to sense variation in said ratio; and
   feedback linkage means interconnecting said speed sensing means and said second summing link means and operative to provide a restoring force to said second summing link means in opposition to the force provided by said feeding and multiplying linkage means to urge said ball cage member to a centered, neutral location.

9. The apparatus as claimed in claim 8 wherein said speed sensing means comprise:
   a ball driven cam means operative to rotate in response to said ratio, varies from a predetermined value; and
   bell crank link means connected to, and forming a portion of, said feedback linkage means and having one end operatively coupled to said cam means to move in response to said cam means rotation to provide said restoring force.

References Cited

UNITED STATES PATENTS

| | | | |
|---|---|---|---|
| 2,834,843 | 5/1958 | Auger | 74—388 |
| 3,048,050 | 8/1962 | Perryman | 74—388 |
| 3,151,493 | 10/1964 | Geyer | 74—388 |
| 3,222,944 | 12/1965 | Harned. | |

LEONARD H. GERIN, Primary Examiner